(12) United States Patent
Lin et al.

(10) Patent No.: US 6,610,104 B1
(45) Date of Patent: Aug. 26, 2003

(54) METHOD FOR UPDATING A DOCUMENT BY MEANS OF APPENDING

(75) Inventors: Kuang-Shin Lin, Taipei (TW); Tong-S Chen, Taipei (TW); Jian Wu, Tientsin (CN)

(73) Assignee: Inventec Corp., Taipei (TW)

( * ) Notice: Subject to any disclaimer, the term of this patent is extended or adjusted under 35 U.S.C. 154(b) by 0 days.

(21) Appl. No.: 09/350,117

(22) Filed: Jul. 9, 1999

(30) Foreign Application Priority Data

May 5, 1999 (TW) ........................................ 88107282 A (51) Int. Cl.[7] .............................................. G06F 15/00
(52) U.S. Cl. ........................ 715/511; 715/530; 707/203
(58) Field of Search ................................ 707/511, 203, 707/530, 531, 200; 715/511, 530, 531

(56) References Cited

U.S. PATENT DOCUMENTS

| | | | | |
|---|---|---|---|---|
| 5,483,651 A | * | 1/1996 | Adams et al. ................... 707/1 |
| 5,704,060 A | * | 12/1997 | Del Monte ............... 707/104.1 |
| 5,857,185 A | * | 1/1999 | Yamaura ........................ 707/5 |
| 5,897,143 A | * | 4/1999 | Baaqeil ........................ 283/36 |
| 5,913,209 A | * | 6/1999 | Millett ........................... 707/3 |
| 5,930,801 A | * | 7/1999 | Falkenhainer et al. .. 707/103 R |
| 5,946,697 A | * | 8/1999 | Shen ........................... 707/513 |
| 5,956,722 A | * | 9/1999 | Jacobson et al. ............. 707/10 |
| 5,974,412 A | * | 10/1999 | Hazlehurst et al. ............. 707/3 |
| 5,999,968 A | * | 12/1999 | Tsuda .......................... 709/213 |
| 6,009,442 A | * | 12/1999 | Chen et al. .................. 707/522 |
| 6,026,416 A | * | 2/2000 | Kanerva et al. ............. 715/515 |
| 6,055,526 A | * | 4/2000 | Ambroziak ..................... 707/2 |
| 6,067,541 A | * | 5/2000 | Raju et al. ...................... 707/3 |
| 6,088,694 A | * | 7/2000 | Burns et al. .................... 707/8 |
| 6,122,650 A | * | 9/2000 | Takeyama et al. .......... 707/540 |
| 6,138,124 A | * | 10/2000 | Beckhardt ................... 707/201 |
| 6,161,113 A | * | 12/2000 | Mora et al. .................. 707/505 |
| 6,237,011 B1 | * | 5/2001 | Ferguson et al. ............ 707/515 |
| 6,243,713 B1 | * | 6/2001 | Nelson et al. ............ 707/104.1 |
| 6,256,636 B1 | * | 7/2001 | Choy ...................... 707/103 Z |
| 6,327,611 B1 | * | 12/2001 | Everingham ................ 709/206 |
| 6,415,278 B1 | * | 7/2002 | Sweet et al. .................... 707/2 |
| 6,434,573 B1 | * | 8/2002 | Jacobson et al. ............ 707/201 |
| 6,445,959 B1 | * | 9/2002 | Poth ............................. 700/28 |
| 6,457,017 B2 | * | 9/2002 | Watkins et al. ......... 707/103 R |
| 6,460,047 B1 | * | 10/2002 | Ambroziak ................. 707/102 |
| 6,507,858 B1 | * | 1/2003 | Kanerva et al. ............. 715/515 |
| 6,513,032 B1 | * | 1/2003 | Sutter ............................. 707/3 |

OTHER PUBLICATIONS

Pollari–Malmi et al., Concurrency Control in B–trees with Batch Updates, IEEE, Dec. 1996, pp. 975–984.*
Anderson et al., Minimum Cost Selection of Secondary Indexes for Formatted Files, ACM, Mar. 1977, pp. 68–90.*
Schiel et al., SIM—a system for semi–automatic indexing of multilingual documents, IEEE 1999, pp. 577–581.*
Kanemoto et al., An efficiently updatable index scheme for structured documents, IEEE 1998, pp. 991–996.*
Mili et al., Merging thesauri: principles and evaluation, IEEE 1998, pp. 204–220.*

* cited by examiner

Primary Examiner—Heather R. Herndon
Assistant Examiner—Cong-Lac Huynh
(74) Attorney, Agent, or Firm—Bacon & Thomas, PLLC (57) ABSTRACT

A method for updating a document by means of appending an updated file to the document comprises the steps of reading an original document; initializing the original document to have a name and an index number for correspondingly identifying the original document; opening the updated file; establishing a name for correspondingly identifying the updated file; and appending the updated file to the original document to form an updated document. By utilizing the method, the file size and the download time of the updated document are reduced, as well as enabling a user to easily carry out a query to documents with different versions and a switching between them.

5 Claims, 8 Drawing Sheets

METHOD FOR UPDATING A DOCUMENT BY MEANS OF APPENDING

FIELD OF THE INVENTION

The present invention relates to a method for updating a document, and more particularly to a method for updating a document by means of appending new materials to an old version document.

BACKGROUND OF THE INVENTION

Typically, there are two techniques employed to obtain updated information, namely 1) by mail, i.e., information provider mails a diskette or CD comprising the updated information to a user, or 2) by accessing information through Internet. Information retrieved by both techniques are stored in an updated document comprising the updated information and information stored in the old document. Then, the updated document replaces the old document in the next data update.

Both techniques are easy to implement. However, the updated document size tends to become larger as the update version becomes newer. Further, the download time for such updated document is going to become longer as the file size grows. As a result, a user may cost more on retrieving information through Internet as well as have to use a larger capacity disk to store the growing file. Additionally, it is impossible to implement the document updating and the identification of the old and new versions automatically. To the worse, the determination between different versions is difficult and time consuming.

Thus, it is desirable to provide an improved document updating method to overcome the above drawbacks of prior art.

SUMMARY OF THE INVENTION

It is an object of the present invention to provide a method for updating a document by means of appending for reducing the file size of an updated document as well as reducing the time to download the updated document through Internet.

It is another object of the present invention to provide a method for updating a document by means of appending for enabling a user to easily carry out a query to documents with different versions and a switching between them.

The advantages of the present invention are realized by providing a method for updating a document by means of appending new materials to an old version document. The method comprises the steps of reading an old version original document; initializing the original document to have a name and an index number for correspondingly identifying the original document; opening an updated file consisting of a new file; establishing a name for correspondingly identifying the updated file; and appending the updated file to the original document to form an updated document.

The above and other objects, features and advantages of the present invention will become apparent from the following detailed description taken with the accompanying drawings.

DETAILED DESCRIPTION OF THE PREFERRED EMBODIMENTS

Figure 1A:
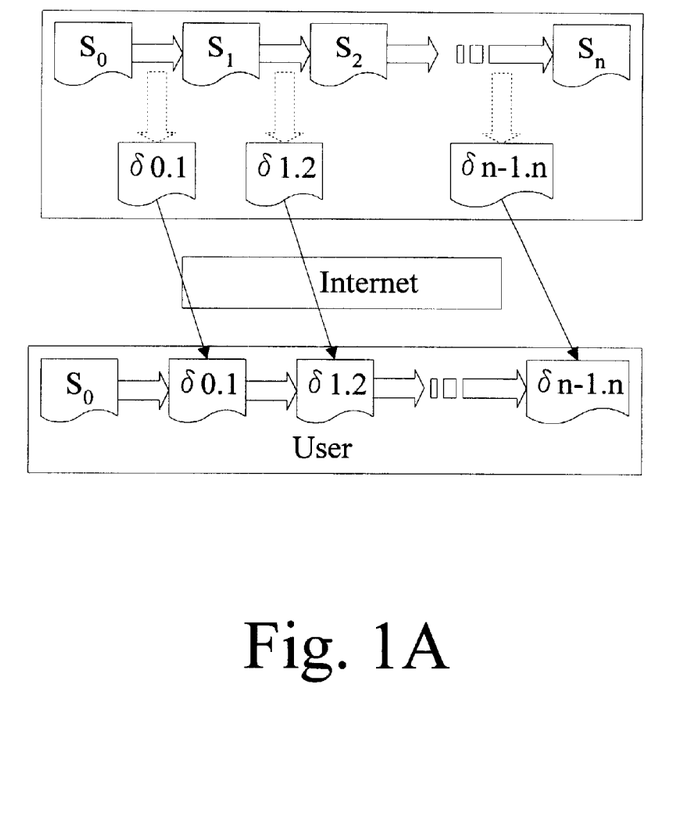
FIG. 1A schematically illustrates the updating of a document of the present invention.
Figure 1B:
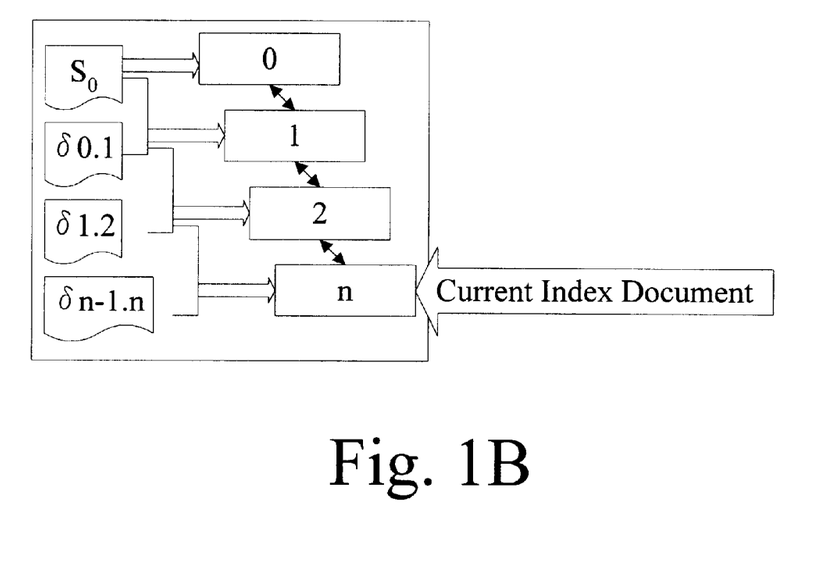
FIG. 1B schematically illustrates the relationship of a document with respect to its corresponding index number.

Referring to FIGS. 1A and 1B, the following steps need to be performed during an old version original document (e.g., S0) provided by an application program developer being updated to an updated version document (e.g., S1):

First, read the old version original document by the developer's computer. Second, initialize the original document (S0) for generating an index number (e.g., zero). Then, open an updated document (S1) comprising a new file (i.e., the generated document ($\delta 0.1$)) not included in the original document (S0). Then, transfer the updated document (S1) through Internet to the users' computers each having the old version document. It is apparent to persons skilled in the art that the updated document (S1) can also be stored in a diskette and mailed to the users. Then, append the generated document ($\delta 0.1$) to the old version original document (S0) to form a new version document. At this moment, a corresponding index number (e.g., one) is established by the user's computer with respect to the combined new document (S0+$\delta 0.1$). Similarly, as the developer continues to update the versions of a document for example from versions S1 to S2, . . . , Sn−1 to Sn, and sequentially transfer the updated or generated documents ($\delta 0.1$, $\delta 1.2$, . . . , $\delta$n−1.n) directly to the user and append the generated documents ($\delta 0.1$, $\delta 1.2$, . . . , $\delta$n−1.n) to the latest old version document owned by the user to form a new version document, the user's computer will establish a corresponding index number (e.g., 0, 1, . . . , n) with respect to the new version document (S0+$\delta 0.1$ . . . +$\delta$n−1. n).

Figure 2:
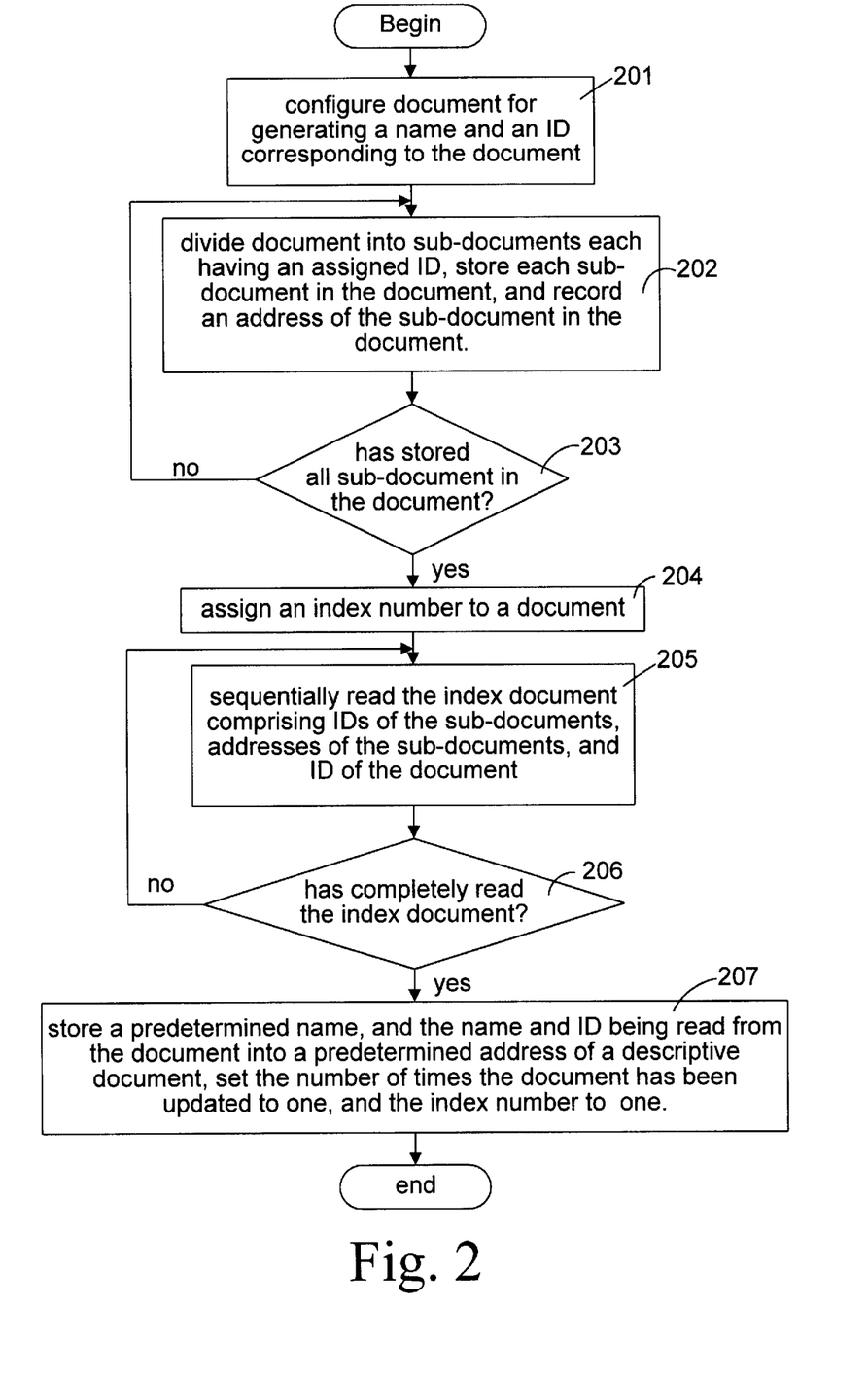
FIG. 2 is a flowchart illustrating how to initialize an original document of the present invention.

Referring to FIG. 2, during the old version original document being updated to the new version document, the developer's computer will read and initialize the old version original document in accordance with the following steps:

At step 201, initialize the old version original document for generating a name and a unique identification ("ID") corresponding to the original document.

At step 202, divide the original document into a number of sub-documents, each of the sub-documents respectively being assigned a unique ID. The computer will store the content of the sub-documents into the new version of the original document, and record the addresses of the sub-documents stored in the new version document.

At step 203, a query is made as to whether the computer has stored all content of the sub-documents in the new version document. It yes, the process proceeds to step 204. If not, the process loops back to step 202 to keep on storing.

A step 204, assign all index number with respect to the new version document.

At step 205, sequentially read the content of the index document comprising the IDs of the sub-documents, the addresses of the sub-documents, and the ID of the document.

At step 206, a query is made as to whether the content of the index document have been completely read out. If yes, the process proceeds to step 207. If not, the process loops back to step 205 to keep on reading.

At step 207, the computer stores a predetermined name, and the name and the unique ID being read from the document into a predetermined address of a descriptive document. The descriptive document functions to store relevant document. And, set the number of times the document has been updated to one, number to one. Then end the process.

Figure 3:
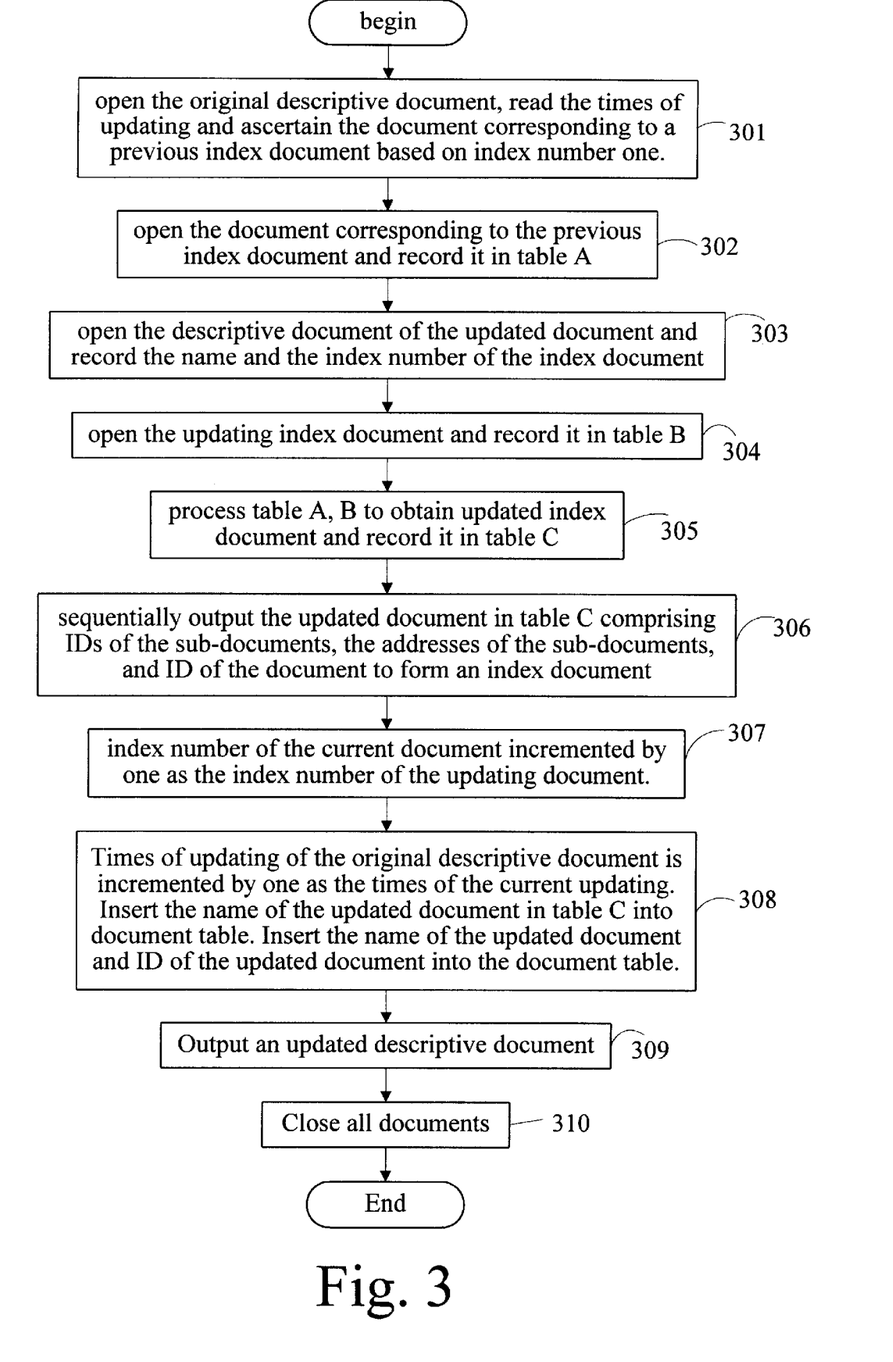
FIG. 3 is a flowchart illustrating how to produce an updated document of the present invention.

Referring to FIG. 3, during the old version original document being updated to the new version document, the developer's computer generates an updated document in accordance with the following steps:

At step 301, open the corresponding descriptive document of the original document after initializing the original document. Then, read the times of updating (i.e., one as stated at step 207) and ascertain the document (i.e., the original document) corresponding to a previous index document based on index number one.

At step 302, open the document corresponding to the previous index document and record it in table A.

At step 303, open the descriptive document of the updated document and record the name of the index document and the index number thereof.

At step 304, open the updating index document and record it in table B.

At step 305, process table A and table B to obtain an updated index document and record it in table C.

At step 306, sequentially output the content of the updated document recorded in table C comprising the IDs of the sub-documents, the addresses of the sub-documents, and the ID of the document. The output subsequently forms an index document.

At step 307, the index number of the current document is incremented by one as the index number of the updating document.

At step 308, the times of updating the original descriptive document is incremented by one as the times of the current updating. Insert the name of the updated document (in table C) into a suitable position of the document table. Insert the name of the updated document and the ID of the updated document into a suitable position of the document table.

At step 309, output an updated descriptive document.

At step 310, close all opened documents for accomplishing the purpose of updating document. Then end up the process.

Figure 3A:
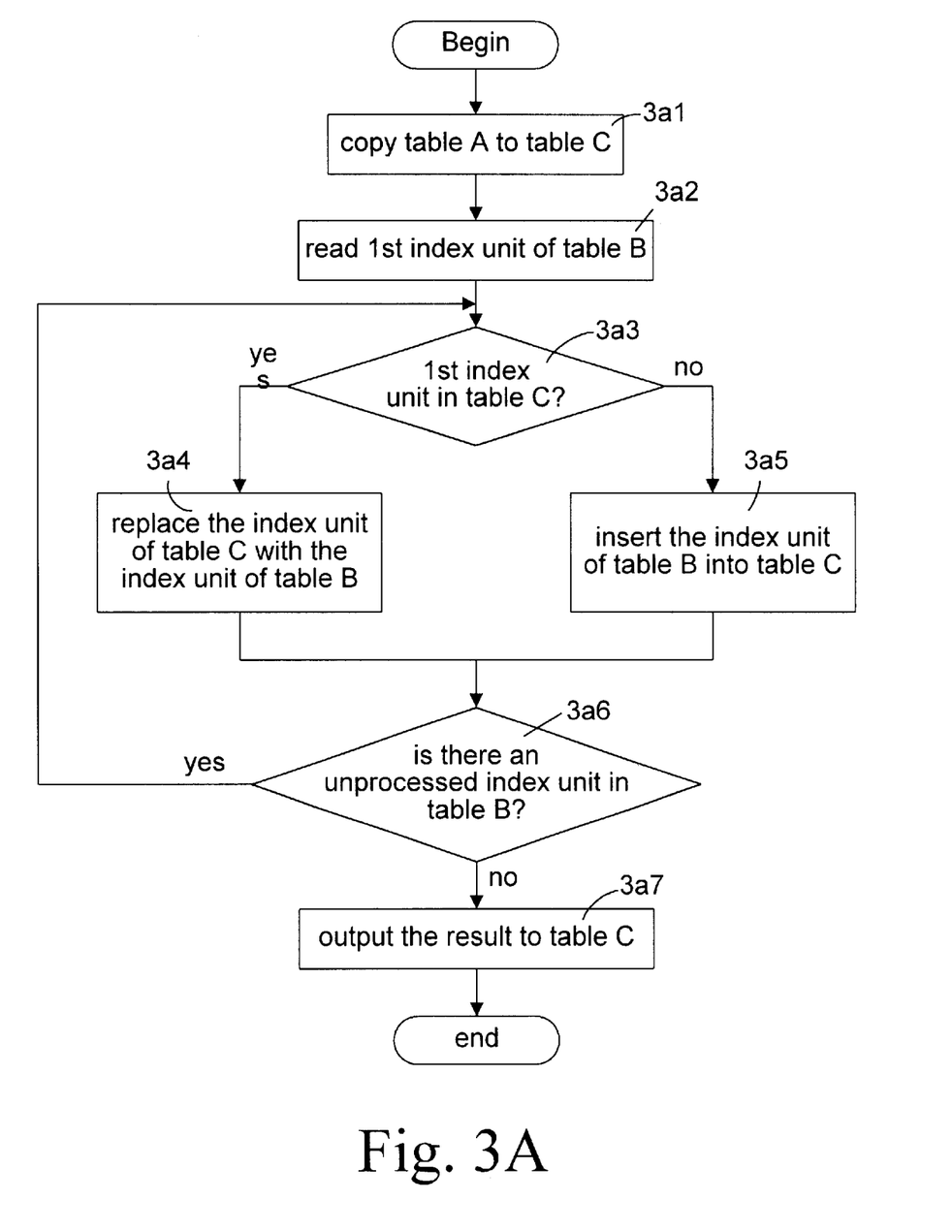
FIG. 3A is a flowchart illustrating the identification of an updated document of the present invention.

In FIG. 3A, a flowchart illustrates the processing of index document (in table B) and its corresponding previous index document (in table C) for identifying an updated index document (in table C) as follows:

At step 3a1, copy the content of table A to table C.

At step 3a2, read the first index unit of table B.

At step 3a3, a query is made as to whether the content of the first index unit is in table C. If yes, the process proceeds to step 3a4. If not, the process proceeds to step 3a5.

At step 3a4, replace the index unit in table C with the index unit in table B.

At step 3a5, insert the index unit in table B into table C.

At step 3a6, a query is made as whether there is an unprocessed index unit in table B. If yes, the process loops back to step 3a3. If not, the process proceeds to step 3a7.

At step 3a7, output the result to table C. Then end up the process.

Figure 4:
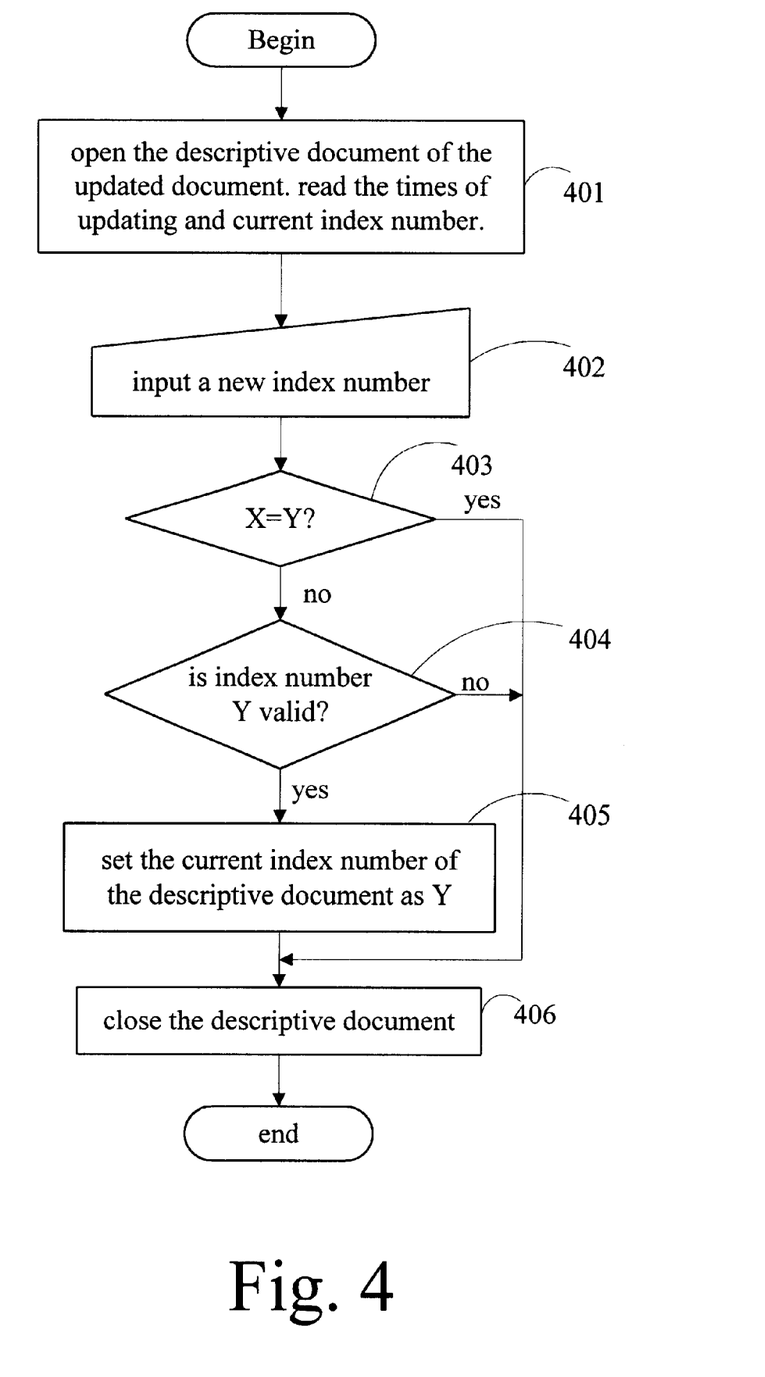
FIG. 4 is a flowchart illustrating the switching between two documents with different versions in accordance with the present invention.

In FIG. 4, a flowchart illustrates the processing of retrieving data from an old version document after an updated document being used as follows:

At step 401, open the descriptive document of the updated document. Read the times of updating and the current index number (e.g., X).

At step 402, input a new index number (e.g., Y) from the user's computer.

At step 403, a query is made as to whether X is equal to Y, i.e., ascertain whether the index document being used is the current index document. If yes, the process proceeds to step 406. If not, the process proceeds to step 404.

At step 404, a query is made as to whether index number Y is valid. If yes, the process proceeds to step 405. If not, the process proceeds to step 406.

At step 405, set the current index number of the descriptive document as Y.

At step 406, close the descriptive document. Then end up the process.

Figure 5:
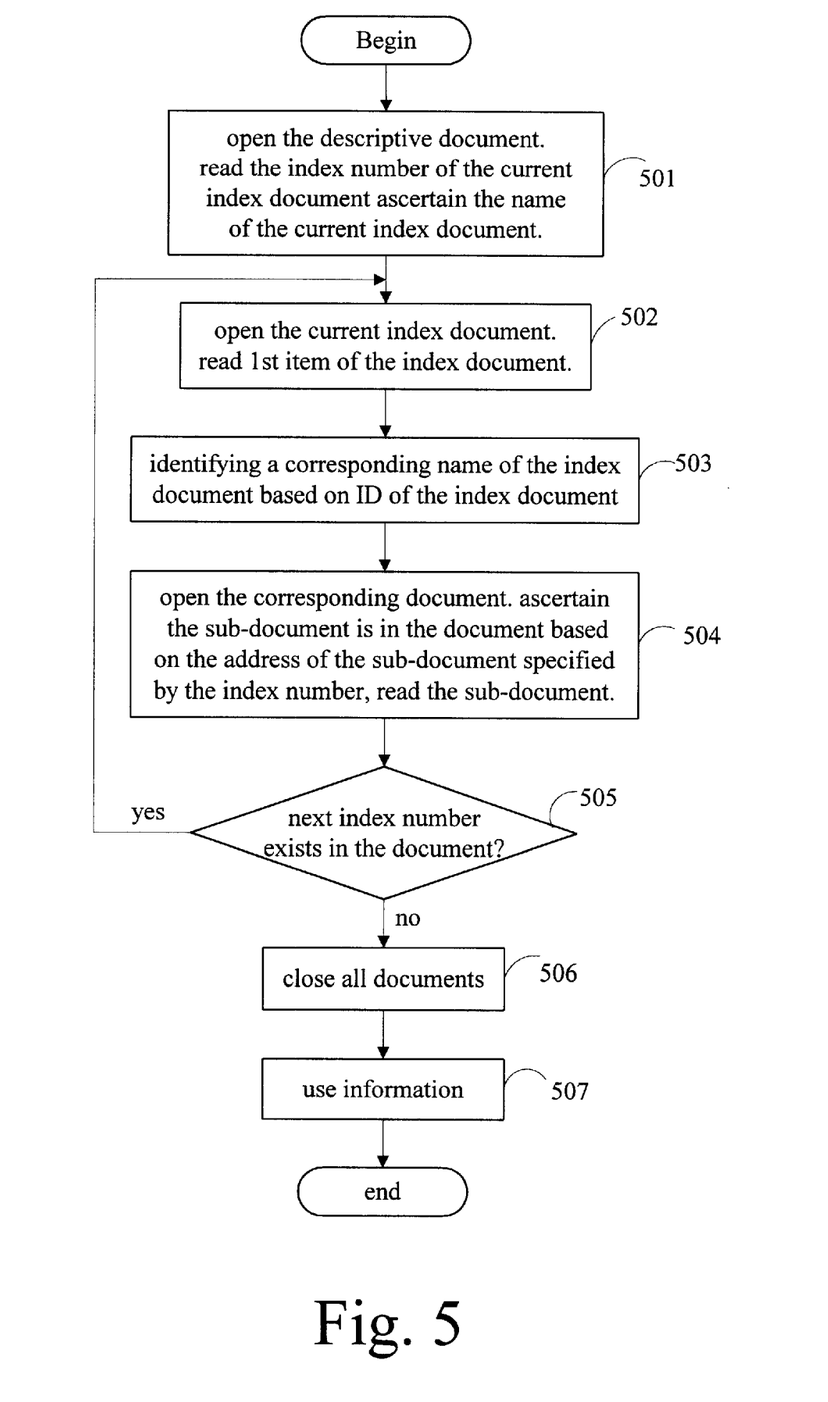
FIG. 5 is a flowchart illustrating the reading of an index document of FIG. 4.

In FIG. 5 a flowchart illustrates the reading of an index document of FIG. 4 by the user's computer as follows:

At step 501, open the descriptive document. Read the index number of the current index document (i.e., the document of the latest updated document). Ascertain the name of the current index document.

At step 502, open the current index document. Read the content of the first item of the index document.

At step 503, identifying a corresponding name of the index document based on the IDs of the index document.

At step 504, open the corresponding document. Ascertain that the sub-document is in the document based on the address of the sub-document specified by the index number. Read the sub-document.

At step 505, a query is made as to whether a next index number exists in the document. If yes, i.e., end of the document has not been reached, the process loops back to step 502. If not, i.e., end of the document has been reached, the process proceeds to step 506.

At step 506, close all documents.

At step 507, the user is allowed to use information stored in the document. Then end up the process.

Figure 6:
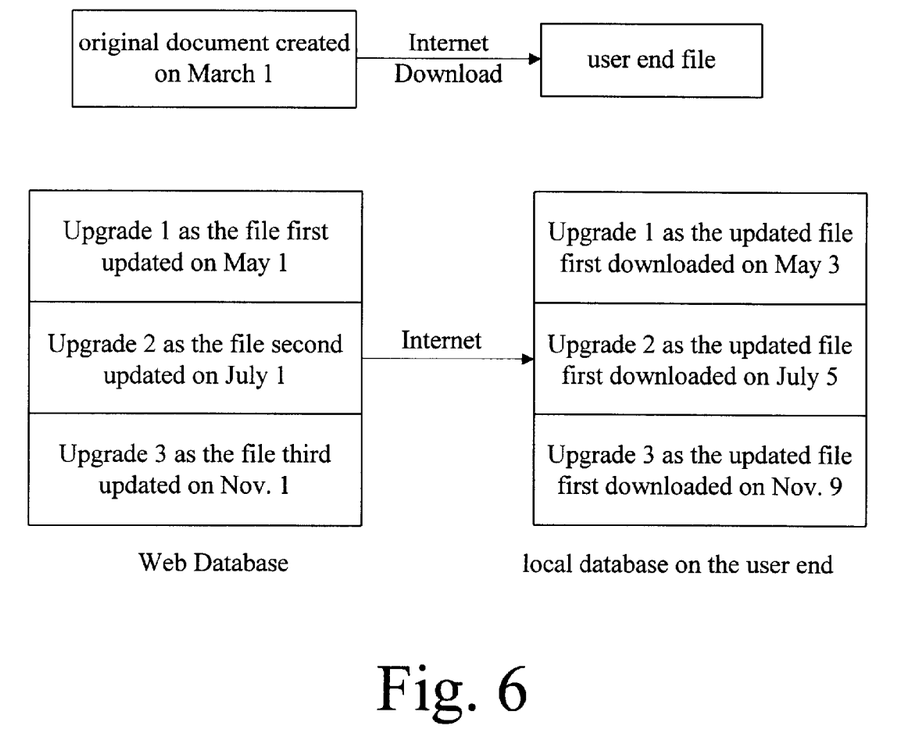
FIG. 6 is a graph schematically illustrating the implementation of the present invention.

In FIG. 6, a graph schematically illustrates the implementation of the present invention. Reference is now made to the upper pat of FIG. 6. It is assumed that an original document is created in a service center on March 1. The document is downloaded to a user's computer through the Internet and stored as a file. Now refer to the lower part of FIG. 6. The file is updated on May 1, July 1, and November 1 and stored as file Upgrade1, Upgrade2, and Upgrade3 respectively. These three files are also downloaded to the user's computer through the Internet.

Figure 6A:
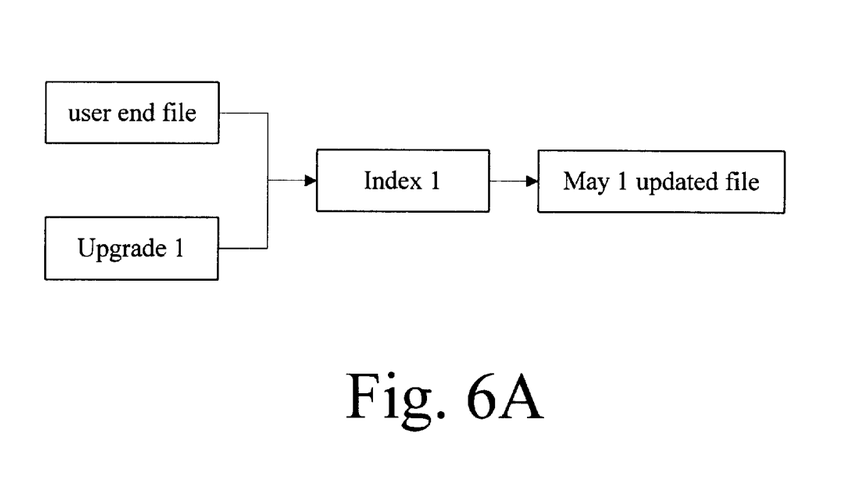
FIG. 6A schematically illustrates a first embodiment of the present invention.

In FIG. 6A, the upgrade1 is appended automatically to the original user's file by the user's computer to form an updated file having an index number one (e.g., index1) on May 1. In other words, the user can use information stored in the file of May 1 version.

Figure 6B:
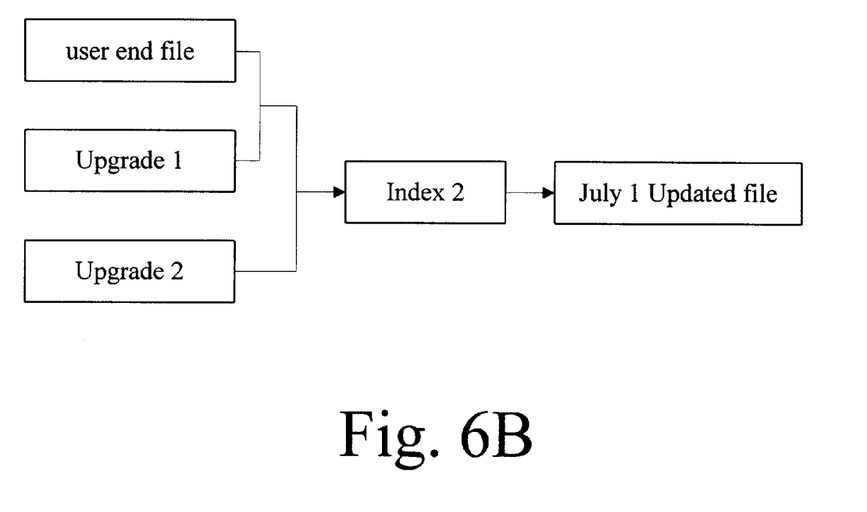
FIG. 6B schematically illustrates a second embodiment of the present invention.

In FIG. 6B, the Upgrade2 is appended automatically to the original user's file and the Upgrade1 by the user's computer to form an updated file having an index number two (e.g., Index2) on July 1. In other words, the user can use information stored in the file of July 1 version.

Figure 6C:
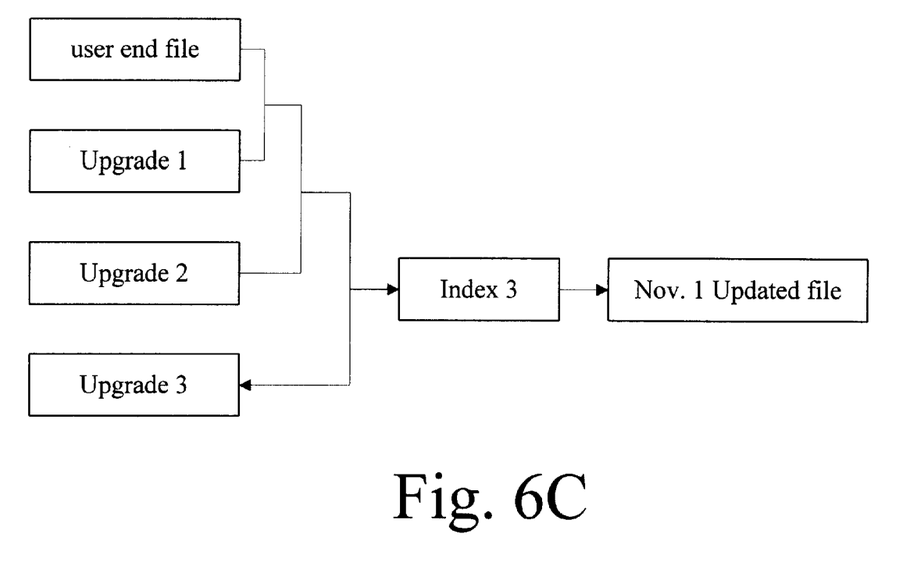
FIG. 6C schematically illustrates a third embodiment of the present invention.

In FIG. 6C, the Upgrade3 is appended automatically to the original user's file, Upgrade1, and the Upgrade2 by the user's computer to form an updated file having an index number three (e.g., Index3) on November 1. In other words, the user can use information stored in the file of November 1 version.

In brief, a user is able to retrieve the required file by identifying the unique index number. For example, retrieve the May 1 version file by identifying the Index1, the July 1 version file by identifying the Index2, and the November 1 version file by identifying the Index3, and so on. It is apparent that a version auto-identification, and document update tracking is made possible in accordance with the teaching of the invention.

While the invention herein disclosed has been described by means of specific embodiments, numerous modifications and variations could be made thereto by those skilled in the art without departing from the scope of the invention set forth in the claims.

What is claimed is:

1. A method for updating a document by means of appending a new file to the document, comprising the steps of:
    (a) reading an original document;
    (b) initializing the original document to generate a name and set an index number for correspondingly identifying the original document;
    (c) opening an updated file consisting of the new file;
    (d) establishing a name for correspondingly identifying the updated file; and
    (e) appending the updated file to the original document to form an updated document;
    wherein step (b) comprises the substeps of:
    (b-1) setting a name and a unique identification ("ID") corresponding to the original document;
    (b-2) dividing the original document into a plurality of sub-documents and assigning each of the sub-documents a unique ID;
    (b-3) storing the content of the sub-documents in a new version of the original document:
    (b-4) recording the addresses of the sub-documents in the new version of the original document;
    (b-5) sequentially reading the content of the original document comprising the IDs of the sub-documents, the addresses of the sub-documents, and the ID of the original document;
    (b-6) storing a predetermined name of a descriptive document, and the name and the unique ID of the original document into a predetermined address of the descriptive document comprising a plurality of relevant documents and the content of the original document; and
    (b-7) setting a number of times the original document has been updated, and setting the index number of the original document: and wherein the method for updating a document further comprises, after initializing the original document, the additional steps of:
    (b-8) opening the descriptive document corresponding to the index number of the original document;
    (b-9) reading the times of updating the original document;
    (b-10) ascertaining the updated document corresponding to the original document based on the time of updating;
    (b-11) opening an index document corresponding to a previously updated document and recording it;
    (b-12) opening the updated descriptive document, and recording a name and an index number of the index document;
    (b-13) opening the updated index document, and recording it;
    (b-14) processing the index document in step (b-11) and step (b-12) to obtain an updated index document, and recording it.
    (b-15) sequentially outputting a content of the updated index document comprising the IDs of the sub-documents, the addresses of the sub-documents, and the ID of the original document;
    (b-16) forming an index document;
    (b-17) incrementing the index number of the index document by one as the index number of the index document being updated;
    (b-18) incrementing the number of times the descriptive document has been updated by one as the times of updating of the index document being updated;
    (b-19) inserting the name of the index document being updated and the ID of the index document being updated into the descriptive document for forming an updated descriptive document; and
    (b-20) outputting the updated descriptive document.

2. The method of claim 1, wherein it all content of the sub-documents has not been stored in the new version of the original document yet, keeping on storing the content of the sub-documents.

3. The method of claim 1 wherein if the content of the original document has not been completely read out yet, keeping on reading the content of the original document.

4. The method of claim 1, wherein step (b-14) further comprises the sub-steps of:
    (b-14-i) copying the index document corresponding to the previously updated document to the index document being updated,
    (b-14-ii) reading a first index unit of the index document being updated;
    (b-14-iii) identifying whether the first index unit is in the index document being updated if yes, replacing the index unit of the index document being updated with the first index unit thereof, and if not, inserting the first index unit into the index document being updated; and
    (b-14-iv) outputting the updated index document.

5. The method of claim 4, wherein if there is an unprocessed index unit in the index document being updated, keeping on identifying whether the first index unit is in the index document being updated.

* * * * *